United States Patent [19]

Ohnishi

[11] Patent Number: 5,457,809
[45] Date of Patent: Oct. 10, 1995

[54] GROUP COMMUNICATIONS METHOD BETWEEN MOBILE STATIONS

[75] Inventor: Toshikazu Ohnishi, Tokyo, Japan

[73] Assignee: NEC Corporation, Tokyo, Japan

[21] Appl. No.: 229,733

[22] Filed: Apr. 19, 1994

[30] Foreign Application Priority Data

Apr. 20, 1993 [JP] Japan .................................. 5-091755

[51] Int. Cl.$^6$ ...................................... H04B 1/00
[52] U.S. Cl. ...................... 455/33.1; 455/34.1; 455/56.1
[58] Field of Search .................................. 495/33.1, 34.1, 495/34.2, 54.1, 56.1; 379/58

[56] References Cited

U.S. PATENT DOCUMENTS

| | | | |
|---|---|---|---|
| 4,817,190 | 3/1989 | Comroe et al. | 455/56.1 |
| 5,095,529 | 3/1992 | Comroe et al. | 455/34.1 |
| 5,274,837 | 12/1993 | Childress et al. | 455/34.2 |

FOREIGN PATENT DOCUMENTS 5-22220  1/1993  Japan .

Primary Examiner—Reinhard J. Eisenzopf
Assistant Examiner—Andrew Faile
Attorney, Agent, or Firm—Foley & Lardner

[57] ABSTRACT

When a particular mobile station transmits a call out signal including a group number of the mobile station and the call out signal is received by a mobile exchange by way of a mobile base station, the mobile exchange determines whether or not a group number is included in the call out signal. When a group number is included, the mobile exchange transmits a paging signal to all of radio base stations having service areas in which a mobile station or stations of the group are present. Each radio base station receiving the paging signal searches for a mobile station of the group in response to the paging signal and waits paging a response signal or signals from a mobile station or stations thus searched out. When such paging response signals are received by the radio base stations and further by the mobile exchange, the mobile exchange searches out free audio channels for the mobile stations from which the paging response signals have been transmitted, and enables group communications with the sending side mobile station by way of the free audio channels.

6 Claims, 3 Drawing Sheets

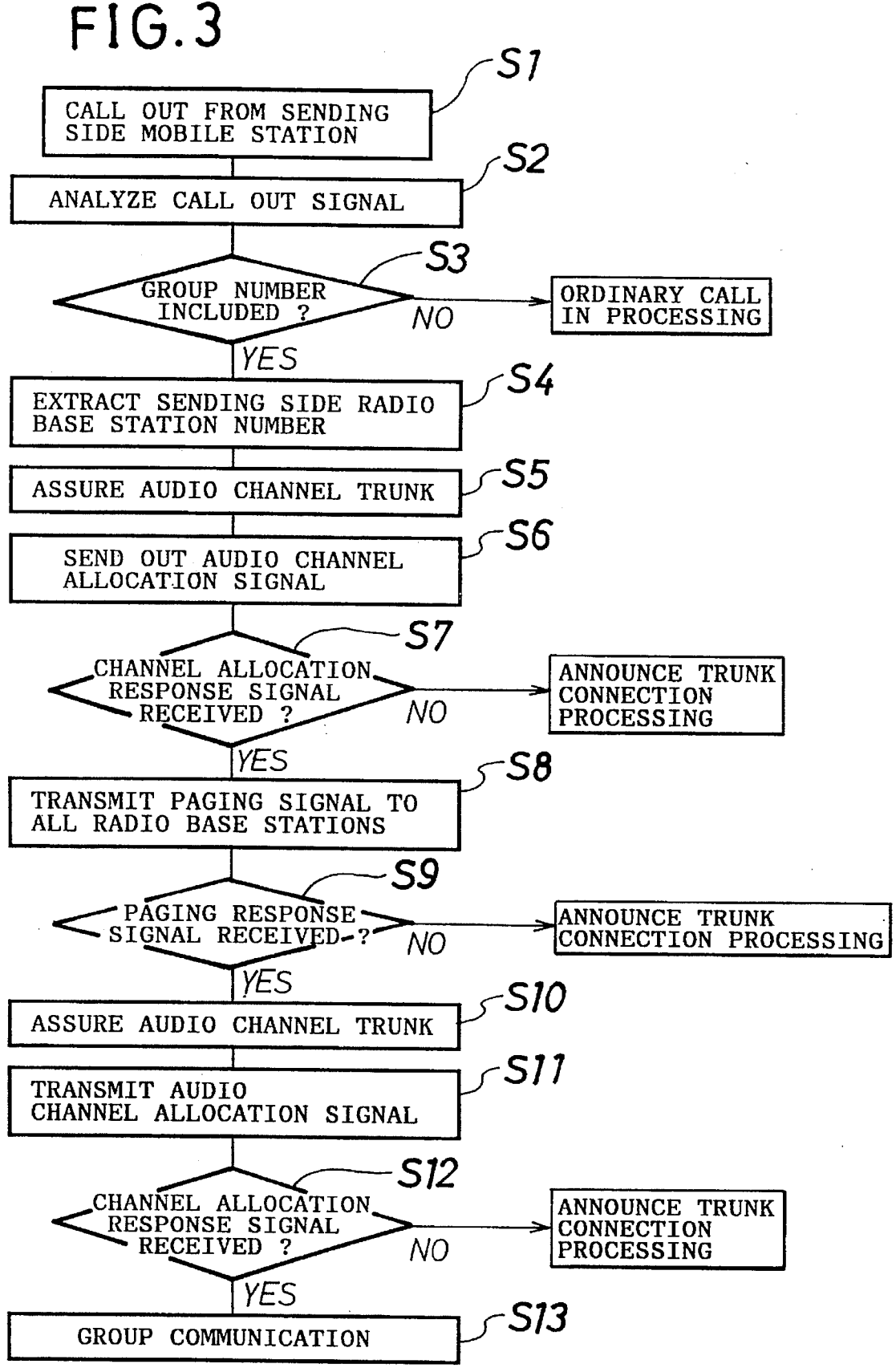

GROUP COMMUNICATIONS METHOD BETWEEN MOBILE STATIONS

BACKGROUND OF THE INVENTION

1. Field of the Invention

This invention relates to a mobile communications system wherein a plurality of radio base stations can communicate with each other by way of a common mobile exchange and each of the radio base stations can communicate with a plurality of mobile stations within a service area by wireless, communications and more particularly to a group communications method for a mobile communications system of the type mentioned wherein different mobile stations in different service areas can communicate with each other by group communications.

2. Description of the Related Art

A group communications method for a mobile communications system of the type mentioned is conventionally known and disclosed, for example, in Japanese Patent Laid-Open Application No. Heisei 5-22220, wherein group communications can be performed by a paging function from a mobile exchange only when a sending side mobile station which belongs to the same group as receiving side mobile stations is present within a same service area as the receiving side mobile stations.

In particular, the mobile exchange transmits a paging signal only to one radio base station which has received a call out signal from a sending side mobile station and has a service area in which the sending side mobile station is present, and searches out and calls receiving side mobile stations of a same group as that of the sending side mobile station only within the service area of the one radio base station. Consequently, when a receiving side mobile station or stations are present in the service area of a different ratio base station from that of the sending side mobile station, group communications cannot be performed.

SUMMARY OF THE INVENTION

It is an object of the present invention to provide a group communications method for a mobile communications system which enables group communications even when one or more receiving side mobile stations of a same group as that of a sending side mobile station are present in the service area of a different radio base station from that of the sending side mobile station.

In order to attain the object described above, according to the present invention, there is provided a group communications method for a mobile communications system wherein a plurality of radio base stations can communicate with each other by way of a common mobile exchange and each of the radio base stations can communicate with a plurality of mobile stations present within a service area thereof by wireless communications, which comprises the steps of transmitting, from a mobile station, a call out signal including a group number representative of a group to which the mobile station belongs in order to perform group communications, receiving, at the mobile exchange, the call out signal including the group number by way of one of the radio base stations which has a service area to which the mobile station belongs, transmitting, from the mobile exchange, a paging signal at least to one or ones of the radio base stations which have service areas in each of which a mobile station or stations having a same group number as the group number received by the mobile exchange are present, transmitting, from each of those of the radio base stations which have received the paging signal, the paging signal to those mobile stations which are present in the service area of the radio base station by wireless communications, and transmitting, when a paging response signal or signals to the paging signal are received from one or more of those mobile stations, such paging response signal or signals to the mobile exchange, transmitting, from the mobile station, a channel allocation signal to each of those of the radio base stations which have service areas to which those of the mobile stations which have transmitted such paging response signals belong, and enabling, after response signals to the channel allocation signals are returned from those mobile stations, to which the channel allocation signals have been transmitted, and are received by the the mobile exchange by way of those of the radio base stations which have service areas to which the mobile stations belong, group communications between those mobile stations which have returned the response signals and the mobile station which has transmitted the group signal by way of the relevant radio base stations.

Preferably, the group communications method for a mobile communications system further comprises the steps of analyzing, after the call out signal transmitted by way of the corresponding radio base station is received by the mobile exchange, the call out signal by the mobile exchange to determine it in accordance with presence or absence of a group number in the call out signal whether or not group communications should be performed, and searching, after the paging response signals are received by the mobile exchange, for free audio channels for the mobile stations from which the paging response signals have been transmitted and transmitting channel allocation signals using the free audio channels thus searched out.

In the group communications method, when a mobile station sends out a call out signal including a group number of itself and the call out signal is received by the mobile exchange by way of the radio base station having a service area in which the mobile station is present, the mobile exchange determines whether or not a group signal is included in the received call out signal. If a group number is included, then the mobile exchange transmits a paging signal to all radio stations having service areas in which movable stations of the group are present. Upon reception of the paging signal, each of the radio base stations searches for mobile stations of the same group in response to the paging signal and waits a paging response signal or signals from a mobile station or stations thus searched out. When such paging response signals are received by the radio base stations and further by the mobile exchange, the mobile exchange searches out free audio channels for the mobile stations from which the paging response signals have been sent out, and enables communications of the mobile stations with the sending side mobile station.

Accordingly, with the group communications method, even when a receiving side mobile station or stations of the same group are present within a service area or areas different from the service area to which the sending side mobile station belongs, group communications between the single sending side mobile station and a plurality of receiving side mobile stations can be performed between or among different service areas.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a flow chart illustrating the procedure of the group communications shown in FIG. 2.

DETAILED DESCRIPTION OF THE PREFERRED EMBODIMENT

Figure 1:
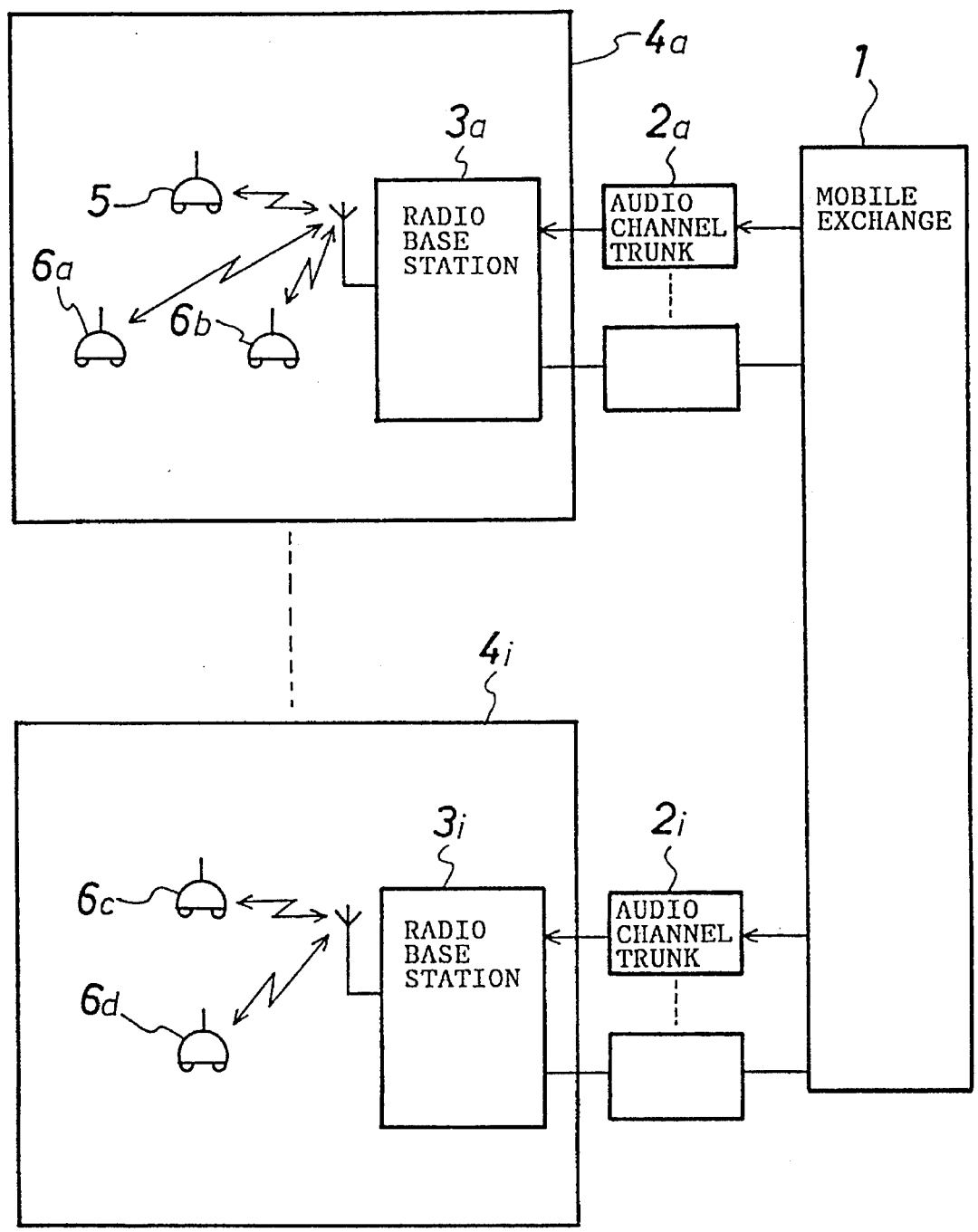
FIG. 1 is a block diagram of a mobile communications system to which a group communications method according to the present invention is applied.

Referring first to FIG. 1, there is shown a mobile communications system to which a group communications method according to the present invention is applied. The system shown includes a plurality of radio base stations $3a$ to $3i$, and a single mobile exchange 1 connected to the radio base stations $3a$ to $3i$ by way of audio channel trunks $2a$ to $2i$.

A plurality of mobile stations may be present in each of the service areas $4a$ to $4i$ of the radio base stations $3a$ to $3e$. In FIG. 1, mobile stations 5, $6a$, $6b$ are shown present in the service area $4a$ of the radio base station $3a$, and mobile stations $6c$ and $6d$ are shown present in the service area $4i$ of the radio base station $3i$. it is assumed here that the mobile stations 5 and $6a$ to $6d$ belong to a same group and have a same group number registered in the mobile exchange 1 and the mobile station 5 serves as a receiving side mobile station in group communications, and will be hereinafter referred to as sending side mobile station, while the other mobile stations $6a$, $6b$, $6c$ and $6d$ serve as receiving side mobile stations and will each be hereinafter referred to as a receiving side mobile station.

Figure 2:
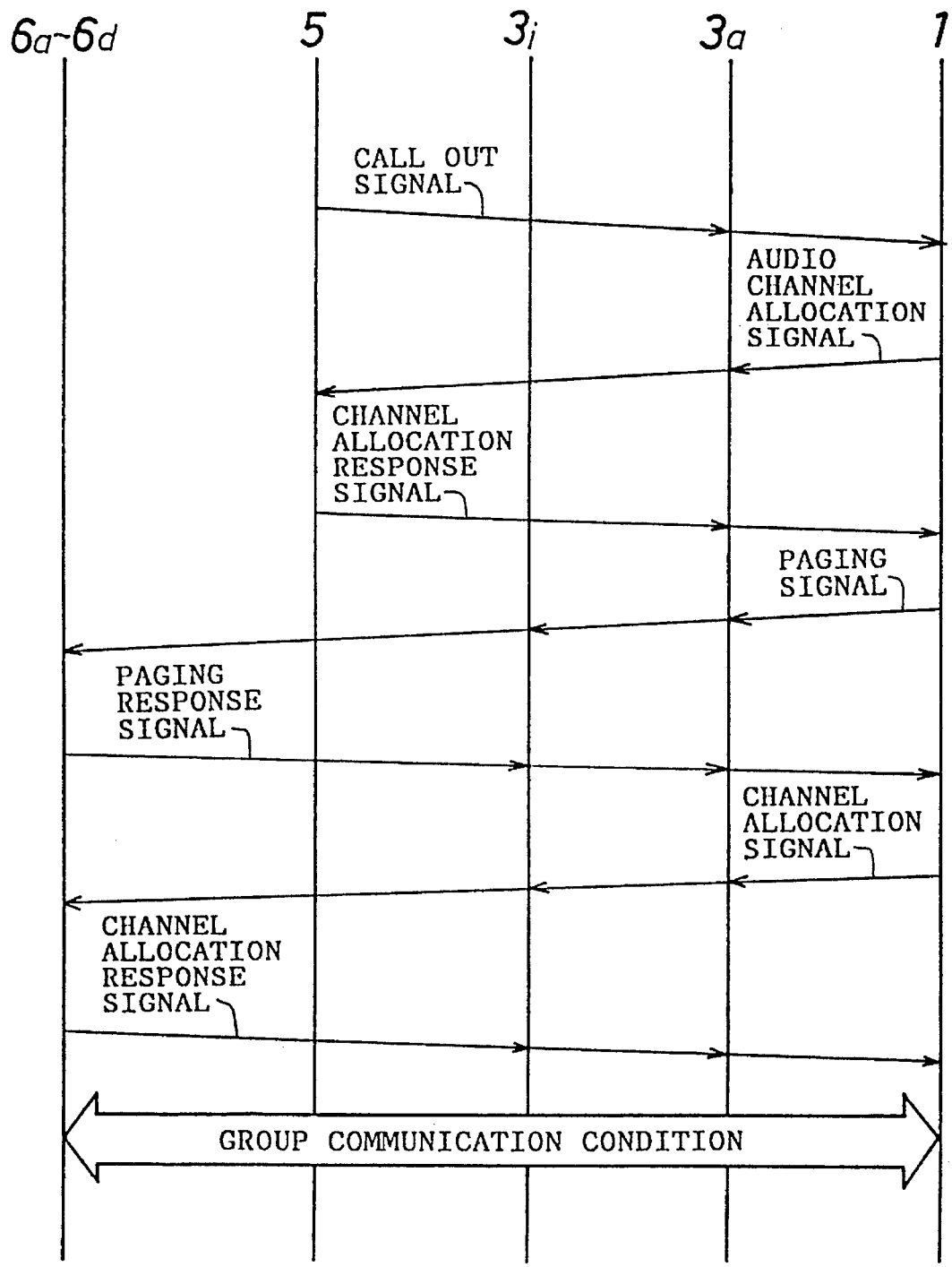
FIG. 2 is a sequence diagram illustrating communications of signals in group communications in the system shown in FIG. 1.

A procedure of group communications which is performed under the conditions described above will be described below with reference to the sequence diagram of FIG. 2 and the flow chart of FIG. 3.

If the receiving side mobile station 5 sends out, when it is present within the service area $4a$, a call out signal including the group number representative of the group of the receiving side station 5 by wireless communications (step S1 in FIG. 3), then the call out signal will be received by the corresponding radio base station $3a$ and then transmitted to the mobile exchange 1 by way of a control line (not shown) from the radio base station $3a$.

After the mobile exchange 1 thus receives the call out signal (which also includes a receiving side number) by way of the radio base station $3a$, it analyzes the call out signal (step S2) and determines whether or not a group number is included in the call out signal (step S3). If a group number is included (YES at step S3), then the mobile exchange 1 extracts the number of the sending side radio base station $3a$ (step S4) and assures the audio channel trunk $2a$ for the mobile station 5 (step S5), whereafter it transmits an audio channel allocation signal to the sending side mobile station 5 by way of the radio base station $3a$ (step S6).

When the sending side mobile station 5 returns a channel allocation response signal to the audio channel allocation signal and the channel allocation response signal is received by the mobile exchange 1 by way of the radio base station $3a$ (YES at step S7), tuning with the receiving side mobile station 5 is established.

It is to be noted that, if the analysis at step S2 reveals that no group number is included in the call out signal (NO at step S3), a single ordinary call in processing to a particular sending side mobile station designated by the call out signal from the sending side mobile station 5 is performed.

On the other hand, when the determination at step S7 is "NO", that is, when no channel allocation response signal is received within a preset time, connection processing to an announce trunk as is well known in the art is performed.

After the control sequence advances from step S7 to step S8, the mobile exchange 1 transmits a paging signal for group communications to all of the radio base stations $3a$ to $3i$ connected thereto. It is to be noted that such transmission must not necessarily be performed to all of the radio base stations $3a$ to $3i$, and alternatively, transmission may be performed to a selected one or ones of the radio base stations having a service area or areas in which a mobile station or stations of the same group number as the group number of the received call out signal may possibly be present.

Each of the radio base stations which have received the paging signal for group communications from the mobile exchange 1 searches for a receiving side mobile station within the service area thereof in response to the paging signal and waits for a paging response signal or signals from a receiving side mobile station or stations thus searched out. Then, after a paging response signal or signals from such receiving side mobile station or stations are received (YES at step S9), the radio base station transmits a paging response signal to the mobile exchange 1. In the system shown in FIG. 1, a paging response signal is returned from the receiving side mobile stations $6a$ and $6b$ within the service area $4a$ of the radio base station $3a$ and from the receiving side mobile stations $6c$ and $6d$ within the service area $4i$ of the radio base station $3i$.

After such paging response signals are received by way of the radio base stations, the mobile exchange 1 assures free ones of the audio channel trunks $2a$ to $2i$ only for the receiving side mobile stations $6a$, $6b$, $6c$, and $6d$ from which the paging response signals have been received (step S10), and transmits audio channel allocation signals which designate the audio channels (step S11). The receiving side mobile stations $6a$, $6b$, $6c$ and $6d$ receive the audio channel allocation signals and return channel allocation response signals to the audio channel allocation signals. When the mobile exchange 1 receives the response signals by way of the radio base stations (YES at step S12), tuning with the receiving side mobile stations $6a$, $6b$, $6c$ and $6d$ is established, and group communications with the sending side mobile station 5 are enabled (step S13).

It is to be noted that, when the determination at step S9 is "NO" or the determination at step S12 is "NO", announce trunk connection processing is performed similarly as in the case of the determination of "NO" at step S7. The processes at steps S2 to S12 can be achieved by software processing.

Having now fully described the invention, it will be apparent to one of ordinary skill in the art that many changes and modifications can be made thereto without departing from the spirit and scope of the invention as set forth herein.

What is claimed is:

1. A group communications method for a mobile communications system wherein a plurality of radio base stations, each having a corresponding service area, can communicate with each other using a common mobile exchange and each of said radio base stations can communicate with a plurality of mobile stations present within the corresponding service areas of said radio base stations, the method comprising the steps of:

transmitting, from an originating mobile station, a call out signal including a group number representative of a group to which said originating mobile station belongs in order to perform group communications;

transmitting, from one of said radio base stations which has a corresponding service area to which said originating mobile station is present and which has received the call out signal including the group number from said originating mobile station, the call out signal including the group number to said common mobile exchange, receiving, at said common mobile exchange, the call out signal including the group number;

transmitting, from said common mobile exchange, a paging signal to one or more of said radio base stations which have corresponding service areas in which a mobile station or stations having a same group number as the group number received by said common mobile exchange are present;

transmitting, from said one or more of said radio base stations which have received the paging signal, the paging signal to said mobile station or stations having the same group number which are present in the corresponding service areas of said one or more of said radio base stations, and transmitting, when a paging response signal sent by said mobile station or stations having the same group in response to the paging signal are received, the paging response signal to said common mobile exchange;

transmitting, from said common mobile exchange, a channel allocation signal to said one or more of said radio base stations which have corresponding service areas to which said mobile station or stations having the same group number which have transmitted the paging response signal is present;

transmitting, from said one or more of said radio base stations which have received the channel allocation signal from said common mobile exchange, the channel allocation signal to said mobile stations or stations having the same group number which have transmitted the paging response signal; and transmitting, when a channel allocation response signal sent by said mobile station or stations having the same group number in response to the channel allocation signal is received, the channel allocation response signal to said common mobile exchange; and enabling, after the channel allocation response signal is received by said common mobile exchange, group communications between said mobile station or stations having the same group number which have transmitted the channel allocation response signal and the originating mobile station using said one or more of said radio base stations.

2. A group communications method for a mobile communications system as claimed in claim 1, further comprising the steps of:

analyzing, after the call out signal is received by said common mobile exchange, the call out signal by said common mobile exchange to determine, in accordance with a presence or absence of a group number in the call out signal, whether or not group communications should be performed; and searching, after the paging response signal is received by said common mobile exchange, for free audio channels for said mobile station or stations from which the paging response has been transmitted, and transmitting said channel allocation signal using the free audio channels.

3. A group communications method for performing group communications between mobile stations which belong to a same group, in a mobile communications system wherein a plurality of radio base stations, each having a corresponding service area, can communicate with each other by using a common mobile exchange and each of said radio base stations can communicate with a mobile station or stations present within the corresponding service areas, the method comprising the steps of:

transmitting, from an originating station, a call out signal including a group number representative of a group to which said originating mobile station belongs;

transmitting, from one of said radio base stations which has received the call out signal including the group number, the call out signal to said common mobile exchange;

transmitting, after the call out signal including the group number is received by said common mobile exchange, a paging signal from said common mobile exchange to said radio base stations;

transmitting, from said radio base stations which have received the paging signal, the paging signal to said mobile stations within the corresponding service areas of said radio base stations;

transmitting, from terminating mobile stations which are different from said originating mobile station but which belong to the same group as that of said originating mobile station and which have received the paging signal, a paging response signal in response to the paging signal;

transmitting, from said radio base stations which have received the paging response signal sent by said terminating mobile stations in the corresponding service areas of said radio base stations, the paging response signal to said common mobile exchange;

transmitting, from said common mobile exchange, a channel allocation signal to said radio base stations which have transmitted the paging response signal;

transmitting, from said radio base stations which have received the channel allocation signal, the channel allocation signal to said terminating mobile stations in the corresponding service areas of said radio base stations;

transmitting, from said terminating mobile stations which have received the channel allocation signal, a channel allocation response signal in response to the channel allocation signal;

transmitting, from said radio base stations which have received the channel allocation response signal, the channel allocation response signal to said common mobile exchange; and enabling, after the channel allocation response signal is received by said common mobile exchange, group communications between said originating mobile stations and said terminating mobile stations.

4. A group communications method as claimed in claim 3, further comprising the steps of:

analyzing, after the call out signal is received by said common mobile exchange, the call out signal to check whether or not a group number is included in the call out signal, and to determine, when a group number is included, whether group communications should be performed; and securing, after the paging response signal is received by said common mobile exchange, free audio channels to transmit a channel allocation signal to said terminating mobile stations which have transmitted the paging response signal.

5. A group communications method as claimed in claim 1, wherein all communications between said mobile stations and said radio base stations is performed by over-the-air, wireless communications.

6. A group communications method as claimed in claim 3, wherein all communications between said mobile stations and said radio base stations is performed by over-the-air, wireless communications.

* * * * *